United States Patent Office 3,709,707
Patented Jan. 9, 1973

3,709,707
ATTRITION RESISTANT GRANULES, METHOD OF MAKING THE SAME AND CEMENTITIOUS GROUT AND CONCRETE COMPOSITIONS CONTAINING THE SAME
Solomon Jacob Rehmar, East Euclid, Ohio, assignor to Construction Techniques, Inc., Cleveland, Ohio
No Drawing. Filed Dec. 14, 1971, Ser. No. 207,997
Int. Cl. C09c 1/64; C04b 21/02, 31/40
U.S. Cl. 106—87          9 Claims

ABSTRACT OF THE DISCLOSURE

Granules containing particles of substantially oxide free aluminum, a water soluble binder and powdered inorganic extender are made resistant to attrition, by contact with cementitious grout and concrete compositions which contain abrasive materials (e.g. sand) by incorporating a low molecular weight polyhydric alcohol in the composition from which the granules are formed.

---

This invention relates to an attrition resistant granular additive for cementitious grout and concrete compositions, which contain abrasive materials, e.g., sand.

In my U.S. Pat. 3,197,323 I describe additive granules for cementitious grout and concrete compositions which granules contain particles of aluminum protected against oxidation by the process of an oil film, a water soluble binder, and a powdered extender. These granules, when admixed with an aqueous slurry containing hydraulic cement disintegrate, exposing the oil covered surfaces of the aluminum particles to alkaline conditions. This causes a removal of the oil film permitting the aluminum particles to react, with the evolution of gas. The gas generated exerts an aerating effect on the grout or concrete and it generally offsets the contraction through shrinkage which normally occurs as hydraulic cement hardens. The generation of gas serves the additional function of opposing the normal tendency of sand and cement in the grout or concrete to settle. This minimizes a phenomenon known as bleeding, which is characterized by the collection of separated water at the surface of the grout or concrete.

In my U.S. Pat. 3,579,366 I describe an improved additive granule which is characterized by a skeletal structure and a network of interstitial voids formed by in situ gas liberation. The skeletal structure consists essentially of a dispersion of finely divided substantially oxide free aluminum particles in a matrix formed of a powdered inorganic extender and a water soluble binder which is inert with respect to the aluminum particles.

The granules described in my U.S. Pat. 3,579,366 are an improvement over the granules described in my earlier patent in that they are more porous and therefore are more easily wetted by the alkaline liquid developed when water is added to a cementitious grout on concrete material. Therefore, the aluminum particles in the porous granules are more uniformly exposed to the alkaline liquid, and consequently the timing and volume of gas generation can be controlled within narrower limits.

In utilizing the granules described in both of my prior patents, it has been the common practice to mix the granules with hydraulic cement at the factory and transport this mixture to the construction site where water and if desired, sand or other filler, was added. This was done to insure that the structural integrity of the granules would be maintained by minimizing the amount of contact between the granules and sand or other abrasive filler.

The importance of maintaining the structural integrity of the granules can be explained in the following manner.

In order to optimize the desired influence of gas generation throughout the mass of setting grout or concrete, it is necessary that the volume of gas generated be uniformly distributed throughout the mass and that the generation of gas take place during the same time span. In order to accomplish this, it is necessary that the particles of aluminum which represent the situses of gas generation, be uniformly distributed throughout the mass of cement or concrete. If the granules retain their original size, then the logistics problem of uniformly distributing aluminum is limited to one of uniformly distributing the granules throughout the mass. However, where there is a substantial amount of attrition of the granules so that some are substantially reduced in size, then the logistics problem is complicated by the fact that uniform distribution of granules of different sizes will not provide a uniform distribution of aluminum particles. Thus it is important that to the extent practicable, the granules should be made in one size, and be distributed in one size throughout the mass of cementitious grout and concrete materials.

I had found that while the granules produced in accordance with my prior inventions generally withstood satisfactorily the abrasive effect of dry mixing them with the hydraulic cement, a significant amount of attrition would take place when the granules were dry blended with mixtures of hydraulic cement and abrasive fillers, such as sand. Hence, there was a need for an additive granule having improved attrition resistance, and the present invention is addressed to filling that need.

The advantages of being able to dry blend the granules with hydraulic cement and abrasive fillers (e.g. sand) at a plant or other location remote from the construction site will be apparent to those skilled in the art. The most significant advantages are that there is less chance of error in combining the right proportions of ingredients when this is done in-plant; on-site mixing takes place faster since only water need be added; and there is better assurance of getting the proper quality of sand or other abrasive filler.

It will be appreciated however, that the advantages of at attrition resistant granule also obtained where the prior practice of admixing the granules with the cementitious grout and concrete materials at the construction site is continued. Even when exposed to these mixing conditions, the improved granules show substantially less attrition than do the granules produced in accordance with my prior inventions.

It has been found in accordance with the practice of the present invention that an additive granule having substantially improved resistance to attrition can be made by adding to the composition of finely divided aluminum, water soluble binder, and powdered inorganic extender from which my previous granules were made, from about 0.9 to about 1.5 percent by weight of materials constituting the dried granules of a fortifier for the binder in the form of a water soluble polyhydric alcohol which is compatible with the binder and has a molecular weight not substantially in excess of 100. (Unless otherwise indicated all weight percents are based on materials constituting the dried granules.)

When porous granules manufactured in accordance with the teachings of my Pat. No. 3,579,366, and similar porous particles containing a fortifier as described above, were exposed to the abrasive action of sand under conditions similar to those encountered during dry blending, it was found that the attrition resistant granules reduced by more than 70% the attrition suffered by the unfortified granules. It is this magnitude of improvement which makes feasible the preblending of the fortified granules with hydraulic cement and abrasive fillers and transportation of the final composition to a construction site.

In accordance with one aspect of the invention, there is provided, as an additive for abrasive-containing cementitious grout and concrete compositions, an additive granule having an improved resistance to attrition through contact with said abrasive, said granule being formed of a composition comprising from about 7 to about 12 wt. percent of finely divided, substantially oxide free particles of aluminum, from about 2 to about 5 wt. percent of a water soluble binder, from about 86 to about 91 wt. percent of a powdered inorganic extender and from about 0.9 to about 1.5 wt. percent of a fortifier for the binder in the form of a water soluble polyhydric alcohol which is compatible with the binder and has a molecular weight not substantially in excess of 100.

In accordance with another aspect of the invention, there is provided a settable cementitious composition comprising a mixture of hydraulic cement and at least one abrasive material, and dispersed throughout the mixture, attrition resistant additive granules formed of a composition comprising from about 7 to about 12 wt. percent of finely divided, substantially oxide free particles of aluminum, from about 2 to about 5 wt. percent of a water soluble binder, from about 86 to about 91 wt. percent of a powdered inorganic extender and from about 0.9 to about 1.5 wt. percent of a fortifier for the binder in the form of a water soluble polyhydric alcohol which is compatible with the binder and has a molecular weight not substantially in excess of 100.

In accordance with yet another aspect of the invention, there is provided, in a method of forming a granular additive for abrasive-containing cementitious grout and concrete compositions, which method comprises the steps of forming a composition comprising finely divided, substantially oxide free particles of aluminum, a water soluble binder and an inorganic powdered extender into granules, drying the granules and incorporating the same into a cementitious grout or concrete material, the improvement which comprises adding to the composition, prior to forming the granules, a fortifier for the binder in the form of a water soluble polyhydric alcohol which is compatible with the binder and has a molecular weight not substantially in excess of 100.

It is therefore an object of the invention to provide an improved, attrition resistant additive granule for abrasive containing cementitious grout and concrete compositions.

A further object of the invention is to provide an additive granule for abrasive-containing cementitious grout and concrete compositions which granule comprises finely divided aluminum, a water soluble binder, a powdered inorganic extender, and a fortifier for the binder in the form of a water soluble polyhydric alcohol which is compatible with the binder and has a molecular weight not substantially in excess of 100.

Yet another object of the invention is to provide a settable cementitious composition comprising a mixture of hydraulic cement and at least one abrasive material and dispersed in said mixture the attrition resistant additive granules described hereinabove.

Still another object of the invention is to provide an improved method for forming an attrition resistant granular additive for abrasive-containing cementitious grout and concrete compositions wherein the improvement lies in the addition to the granule forming composition, of a fortifier in the form of a water soluble polyhydric alcohol which is compatible with the binder in the granule composition and has a molecular weight not substantially in excess of 100.

These and other objects and advantages of the present invention will become apparent from the following detailed description which includes the best mode presently contemplated for practicing the invention.

Polyhydric alcohols which have been found useful in the practice of the present invention include the following:

| Polyhydric alcohol: | Molecular weight |
|---|---|
| 1,2-ethanediol | 62.07 |
| 1,2-propanediol | 76.11 |
| 1,3-propanediol | 76.11 |
| 1,2,3-propanetriol | 92.11 |
| 2,2'-dihydroxydiethylether | 106.12 |

It will be noted that with the exception of 2,2'-dihydroxydiether, all of these polyhydric alcohols have molecular weights of less than 100. The molecular weight of this last mentioned material is regarded as not being substantially in excess of 100.

It has also been found necessary in achieving the advantages of the present invention to select a polyhydric alcohol which is compatible with the water soluble binder used in the granular forming composition. Suitable binders are described in my U.S. Pats. 3,197,323 and 3,579,366, and include, as preferred materials, cellulose ethers such as methyl cellulose, ethyl cellulose, and carboxy methyl cellulose. Other water soluble binders which may be used include polymers of ethylene oxide, carboxy vinyl polymers, and polyethylene glycols.

The polyhydric alcohol fortifiers would be regarded as being compatible with the water soluble binder if it is miscible with an aqueous solution of the water soluble binder.

In general, the improvement in attrition resistants will be realized if the fortifier is present in an amount of at least about 0.9 wt. percent. Concentrations of fortifiers in excess of about 1.5 wt. percent do not appear to produce any additional improvement and therefore cannot be economically justified.

As noted in my earlier patents any source of finely divided oxide free aluminum particles may be used in the practice of those inventions. The same is true for the present invention. A convenient, commercially available material is a standard 100 mesh varnish leafing aluminum powder.

The same powdered inorganic extenders described in my earlier patents may also be used in the practice of the present invention. These materials include limestone, aluminum oxide, clays such as kaolin and bentonite, carbon, such as coal dust, and mixtures of the foregoing.

The inclusion of a polyhydric alcohol fortifier will improve the attrition resistance of granules prepared in accordance with the teachings of both of my prior patents. However, since the porous granule described in my Pat. No. 3,579,366 constitutes an improvement over the granule described in my earlier patent, it follows that the most desirable combination of properties will be achieved by practicing the present invention in connection with the porous granule described in my later patent.

However, it will be appreciated that whichever granule is modified, it is necessary only to modify the teachings of the apropriate earlier patent by the incorporation of from about 0.9 to about 1.5 wt. percent polyhydric alcohol in the granule forming composition. This can be accomplished conveniently by simply adding the polyhydric alcohol to the water prior to its admixture with the other ingredients of the granule forming composition. Alternatively, the water, water soluble binder and fortifier may be combined and then admixed with the aluminum particles and inorganic powdered extender. The amount of water used may be adjusted between wide limits to accommodate the particular type of granulating or pelletizing equipment to be used. When following the teachings of my Pat. No. 3,579,366 it is, of course, necessary to add a blowing agent. Any of the agents disclosed as well as the methods of incorporation disclosed in my Pat. No. 3,579,366 may be employed in the practice of the present invention. Where a water soluble blowing agent such as ammonium carbonate or ammonium bicarbonate is used, it may be mixed with the water and fortifier before these materials are incorporated with the remaining ingredients. Also, where a blowing agent is used, care should be exercised in the selection of a fortifier, to be sure that the latter has a boiling temperature substantially in excess of the decomposition temperature of the blowing agent. If this precaution is not taken, the fortifier will boil off when the granules are expanded and dried. This is less of a problem when the lower drying temperatures of my Pat. No. 3,197,323 are employed.

EXAMPLE

The following ingredients were admixed with gentle blending until the admixture presented a homogeneous appearance.

| Ingredient: | Pounds |
| --- | --- |
| Aluminum flakes (standard varnish leafing 100 mesh) | 45 |
| Limestone dust, 100 mesh | 400 |
| Methyl cellulose | 10 |
| Ammonium bicarbonate (blowing agent) | 5 |
| 1,2,3-propanetriol | 5 |
| Water | 100 |

The mixing was accomplished by first adding the water, ammonium bicarbonate and fortifier to a ribbon blender, and then mixing in the remaining ingredients.

When the mixing was stopped, the admixture was formed into granules which were then baked at a temperature of about 250° F. until dry.

A second batch of granules were prepared using the same recipe as described above, except omitting the polyhydric alcohol fortifier ingredient and substituting an equal weight of water.

A portion of granules from each of the two batches were screened on a 20 mesh screen and 10 grams of retained granules from each batch were mixed with 500 grams of sand. The mixtures of fortified and unfortified granules and sand were separately tumbled for 120 seconds. The ratio of granules to sand and the amount of exposure to the abrasive action of the sand is comparable to that encountered by the granules during dry blending of the granules with abrasive containing cementitious grout and concrete materials.

The granules and sand were then separated, again using a 20 mesh screen through which all of the sand particles passed. The granules retained on the 20 mesh screen were then weighed and the change in weight from the weight of the original sample of retained granules was noted and classified as "abrasion loss." The test results on three separate runs is reported in Table I below.

TABLE I

| | Abrasion loss (percent) | |
| --- | --- | --- |
| | Fortified granules | Unfortified granules |
| Run number: | | |
| 1 | 0.6 | 4.1 |
| 2 | 1.4 | 6.9 |
| 3 | 1.7 | 6.0 |
| Average | 1.2 | 5.7 |

These data show that the incorporation of a polyhydric alcohol fortifier reduced losses due to abrasion, on the average, by 79%.

The test procedure described above was repeated except that a 30 mesh screen was substituted for the 20 mesh screen, and only two runs were made. The results of these tests are reported in Table II below.

TABLE II

| | Abrasion loss (percent) | |
| --- | --- | --- |
| | Fortified granules | Unfortified granules |
| Run number: | | |
| 1 | 1.7 | 5.3 |
| 2 | 1.4 | 5.8 |
| Average | 1.5 | 5.5 |

These data show that the incorporation of the fortifier reduced abrasion losses, on the average, by more than 72%.

It will be apparent that I have produced an additive granule for abrasive-containing cementitious grout and concrete compositions which has far greater resistance to attrition than previous granule formulations developed by me. This new granule not only improves the performance of the aluminum additive it contains, but also makes feasible the practice of preblending the additive with hydraulic cement and abrasive materials at a point remote from the construction site and transporting the final blend material to the construction site.

The present invention has been described in conjunction with certain specific embodiments. It will be appreciated that modifications may be made in the illustrated embodiments without departing from the intended scope and spirit of the present invention.

Having thus described my invention, I claim:

1. As an additive for an abrasive containing cementitious grout and concrete composition, a granule having improved resistance to attrition through contact with said abrasive, said granule being formed of a composition consisting essentially of from about 7 to 12 weight percent of finely divided, substantially oxide free particles of aluminum, from about 2 to about 5 wt. percent of a water soluble binder, from about 86 to about 91 wt. percent of a powdered inorganic extender and from about 0.9 to about 1.5 wt. percent of a fortifier for said binder in the form of a water soluble polyhydric alcohol which is compatible with said binder and has a molecular weight not substantially in excess of 100.

2. The additive as defined in claim 1 wherein said binder is selected from the group consisting of methyl cellulose, ethyl cellulose and carboxy methyl cellulose and said fortifier is selected from the group consisting of 1,2-ethanediol, 1,2-propanediol, 1,3-propanediol, 1,2,3-propanetriol and 2,2'-dihydroxydiethylether.

3. The additive as defined in claim 1 wherein said granule is characterized by a skeletal structure and a network of interstitial voids formed by in situ gas liberation, the skeletal structure comprising a dispersion of said aluminum particles in a matrix formed of said binder, said extender and said fortifier.

4. The additive as defined in claim 3 wherein said binder is methyl cellulose and said fortifier is 1,2,3-propanetriol.

5. A settable, cementitious composition consisting essentially of a mixture of hydraulic cement which when mixed with water produces alkaline conditions, and at least one abrasive filler, and dispersed throughout said mixture, attrition resistant additive granules formed of a composition comprising from about 7 to 12 wt. percent of finely divided, substantially oxide free particles of aluminum, from about 2 to about 5 wt. percent of a water soluble binder, from about 86 to about 91 wt. percent of a powdered inorganic extender and from about 0.9 to about 1.5 wt. percent of a fortifier for said binder in the form of a water soluble polyhydric alcohol which is compatible with said binder and has a molecular weight not substantially in excess of 100.

6. The composition as defined in claim 5 wherein said binder is selected from the group consisting of methyl cellulose, ethyl cellulose and carboxy methyl cellulose and said fortifier is selected from the group consisting of 1,2-ethanediol, 1,2-propanediol, 1,3-propanediol, 1,2,3-propanetriol and 2,2'-dihydroxydiethylether.

7. The composition as defined in claim 5 wherein said granules are characterized by a skeletal structure and a network of interstitial voids formed by in situ gas liberation, the skeletal structure comprising a dispersion of said aluminum particles in a matrix formed of said binder, said extender and said fortifier.

8. The composition as defined in claim 7 wherein said binder is methyl cellulose and said fortifier is 1,2,3-propanetriol.

9. In the method of forming a granular additive for abrasive-containing cementitious grout and concrete materials which comprises the steps of forming a composition comprising finely divided, substantially oxide free particles of aluminum, a water soluble binder and an inorganic, powdered extender into granules, drying the granules and incorporating the same into said cementitious grout and concrete materials, the improvement which comprises adding to said composition, prior to forming said granules a fortifier for said binder in the form of a water soluble polyhydric alcohol which is compatible with said binder and has a molecular weight not substantially in excess of 100.

References Cited
UNITED STATES PATENTS

| | | | |
|---|---|---|---|
| 3,579,366 | 5/1971 | Rehmar | 106—87 |
| 3,197,323 | 7/1965 | Rehmar | 106—87 |

JAMES E. POER, Primary Examiner

W. T. SCOTT, Assistant Examiner

U.S. Cl. X.R.

106—90, 93, 308 C, 308 D, 314